(12) United States Patent
Abbaspour et al.

(10) Patent No.: US 7,594,209 B2
(45) Date of Patent: Sep. 22, 2009

(54) METHOD FOR INCORPORATING MILLER CAPACITANCE EFFECTS IN DIGITAL CIRCUITS FOR AN ACCURATE TIMING ANALYSIS

(75) Inventors: Soroush Abbaspour, Fishkill, NY (US); Harry J. Beatty, III, Clinton Corners, NY (US)

(73) Assignee: International Business Machines Corporation, Armonk, NY (US)

( * ) Notice: Subject to any disclaimer, the term of this patent is extended or adjusted under 35 U.S.C. 154(b) by 95 days.

(21) Appl. No.: 11/741,042

(22) Filed: Apr. 27, 2007

(65) Prior Publication Data

US 2008/0270960 A1 Oct. 30, 2008

(51) Int. Cl.
*G06F 17/50* (2006.01)

(52) U.S. Cl. ............................................. 716/5; 716/6

(58) Field of Classification Search ....................... None
See application file for complete search history.

(56) References Cited

U.S. PATENT DOCUMENTS

| | | | | |
|---|---|---|---|---|
| 5,845,233 | A * | 12/1998 | Fishburn | 702/108 |
| 6,791,343 | B2 * | 9/2004 | Ramarao et al. | 324/677 |
| 6,940,293 | B2 * | 9/2005 | Ramarao et al. | 324/677 |
| 7,051,305 | B1 * | 5/2006 | Ha et al. | 716/6 |
| 7,299,445 | B2 * | 11/2007 | Levy | 716/17 |
| 7,359,843 | B1 * | 4/2008 | Keller et al. | 703/2 |
| 2005/0232066 | A1 * | 10/2005 | Ishibashi et al. | 365/233 |
| 2007/0011630 | A1 * | 1/2007 | Kashyap et al. | 716/5 |
| 2007/0143719 | A1 * | 6/2007 | Chopra et al. | 716/4 |

OTHER PUBLICATIONS

Chen et al., "Miller Factor for Gate-Level Coupling Delay Calculation," 2000 IEEE, pp. 68-74.*

* cited by examiner

*Primary Examiner*—Leigh Marie Garbowski
(74) *Attorney, Agent, or Firm*—H. Daniel Schnurmann (57) ABSTRACT

A method for performing a static timing analysis on a circuit that includes gates and their respective interconnects by incorporating the effect of Miller capacitance on timing. A primitive gate is selected with its respective fan-out gates, interconnects attached to the primitive gate's output and interconnects attached to the output of each respective fan-out gate are determined. Using a metric, it is determined if the Miller capacitance effect of a CMOS gate on timing of its fan-out gate and interconnect timing is significant for each fan-out gate. If yes, the gate is replaced with a nonlinear driver model. If no, the gate is replaced with a fixed or dynamic capacitance. Next, if at least one of the fan-out gates is replaced with the nonlinear driver model, the primitive gate is likewise replaced with its corresponding nonlinear model as well. Then, a nonlinear timing simulation is performed on the circuit to generate voltage waveforms at the output of the primitive gate and the input of its fan-out gates that incorporate the effect of the Miller capacitance. However, if none of the fan-out gates are replaced with the nonlinear driver model, a conventional gate and interconnect timing analysis is preferably performed.

18 Claims, 7 Drawing Sheets

Delay=$f$(InSlew, CLoad, Vdd, Temp, NPskew, . . . .)

Output Slew=$g$(InSlew, CLoad, Vdd, Temp, NPskew, . . . .)

METHOD FOR INCORPORATING MILLER CAPACITANCE EFFECTS IN DIGITAL CIRCUITS FOR AN ACCURATE TIMING ANALYSIS

FIELD OF THE INVENTION

This invention relates generally to the field of the design automation of Very Large Scale Integrated Circuits (VLSI), and more particularly, to a method of incorporating the effect of Miller capacitance when performing a static timing analysis.

BACKGROUND OF THE INVENTION

Static timing analysis (STA) has been used to verify the timing correctness of VLSI circuits. Voltage waveforms are propagated from primary inputs of the circuit to determine the earliest and latest possible signal arrival times/voltage waveforms as seen at the primary outputs. As the Complementary Metal-Oxide Semiconductor (CMOS) process technologies continue to scale down towards the nanometer domain, the accuracy of the static timing analysis becomes more challenging due to electrical parasitic effects, one being the Miller capacitance. The floating capacitance existing between the input and outputs of a CMOS gate is referred to as Miller capacitance which causes the CMOS gate dynamic input capacitance to become greater than the static parasitic capacitance.

VLSI circuits are typically formed by CMOS gates interconnected by way of wires/interconnect networks. Most STA tools break the timing analysis of these VLSI circuits into two parts: gate timing analysis, namely, the gate propagation delay and output transition times (also referred to as slew analysis), and interconnect or wire timing analysis, i.e., interconnect propagation delay and output transition times (slew) analysis.

Various Model Order Reduction (MOR) techniques have been described, e.g., by L. T. Pillage and R. A. Rohrer, "Asymptotic waveform evaluation for timing analysis," IEEE Trans. on Computer Aided Design, vol. 9, 1990, pp. 352-366, and by A. Odabasioglu, M. Celik, and L. T. Pileggi, "PRIMA: passive reduced-order interconnect macro-modeling algorithm," Proceedings of the IEEE/ACM International Conference on Computer-Aided Design, San Jose, Calif., pp. 58-65, 1997, which have found application for accurate interconnect timing analysis.

On the other hand, for gate timing analysis, the load as seen by the driving gate is modeled by a reduced order model interconnect, such as the RC-π model (that includes the input capacitance of the fan-out gates), as described by P. R. O'Brien and T. L. Savarino, "Modeling the driving-point characteristic of resistive interconnect for accurate delay estimation," Proc. of International Conference on Computer Aided Design, pp. 512-515, 1989. It is worth noting that gate timing analysis will result when calculating the voltage waveform/propagation delay/output slew at the output of the gate driving the RC-π load. Thus, the interconnect propagation delay and output slew are determined by fitting a ramp or a piece-wise-linear waveform obtained at the gate timing analysis step and convolving it with the transfer function of the interconnect/wire reduced order model (it also includes the input capacitance of the fan-out gates). The stage delay (a.k.a. timing stage) is defined as the delay from the input of a CMOS gate/cell to the input of each CMOS gate/cell fanning-out from the primitive gate.

STA has a linear complexity with respect to the number of gates in a design by propagating the arrival times/required arrival times/voltage waveforms through the gates and interconnects, assuming that the timing stages are independent from each other, i.e., it considers a fixed load for the input capacitance of the receiving gates while calculating the RC-π load (for the gate timing analysis step) and interconnect transfer function ROM (for the interconnect timing analysis). However, due to the dynamic effect of the Miller capacitance on timing, this assumption is not valid. In reality, the input capacitance of the CMOS gate varies dynamically during the voltage waveform transition depending on how the signals rise and fall at the two end-terminals of the CMOS gates (i.e., the input and the output of the gates). Consequently, the Miller capacitance effect can cause changes to the calculated RC-π model (which is driven by the CMOS gate) and calculated interconnect ROM (for interconnect timing analysis). Hence, calculating the voltage waveform at the output of a gate/cell can change the input capacitance of the gate and affect the voltage waveforms at the timing points of previous timing stages. The present invention addresses this issue by way of a new STA to achieve high accuracy with respect to 'golden' circuit simulator (i.e., SPICE.)

Miller Capacitance and its Significance on Timing

Figure 1A:
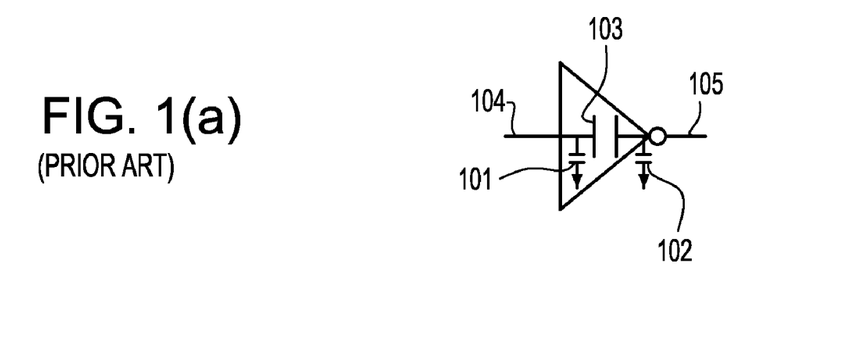
FIG. 1(a) illustrates how CMOS gate capacitances are typically classified into different groups that include the input-capacitance to the ground, the output-capacitance to ground, and the Miller capacitance.

Referring now to FIG. 1(a), the gate capacitances are generally classified into three categories: 1) the input-capacitance to ground 101; 2) the output-capacitance to ground 102; and 3) the Miller capacitance 103. The floating capacitance existing between input and output ports of a CMOS gate/driver is referred to as Miller capacitance, because this capacitance causes the dynamic input capacitance of the CMOS gate to become greater than the static parasitic capacitance to ground. The aforementioned capacitance values 101, 102, 103, are calculated during library characterization and are typically stored in the gate timing library.

Miller capacitance provides a direct path for the electrical signals from the inputs 104 of a CMOS gate to its outputs 105, and vice versa. This direct path implies that the timing stages are not independent from each other, and a signal transition at output 105 of the CMOS gate may affect the timing results at inputs 104 of the gate or even at the timing points of the previous stages of the design.

Figure 1B:
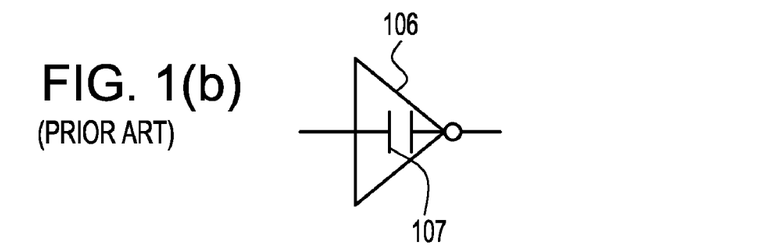
Figure 1C:
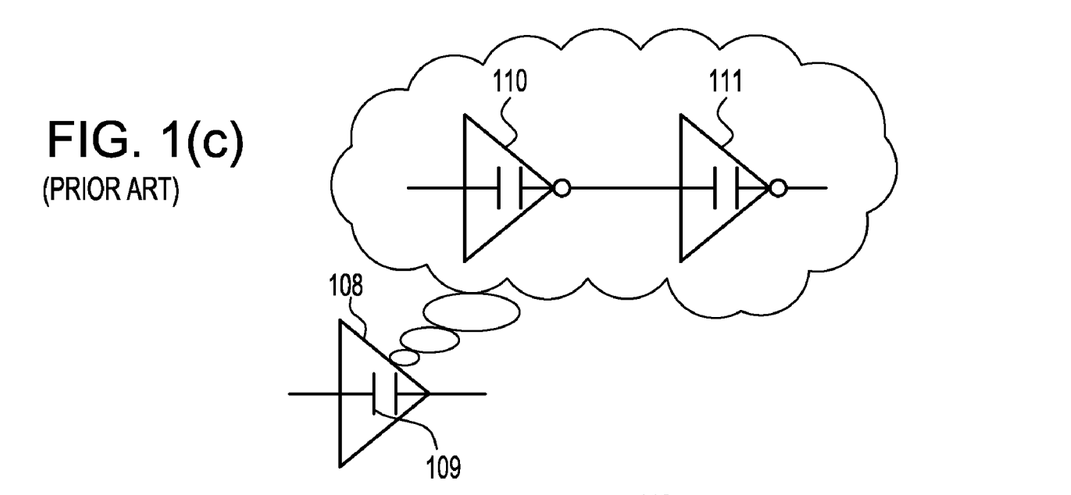
Figure 1D:
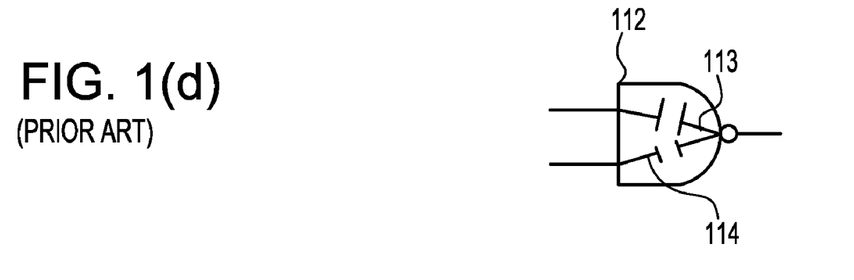

The Miller capacitance value and its effect on timing differ for various types of CMOS gates. For instance, considering CMOS inverter 106 shown in FIG. 1(b), it is possible that a CMOS inverter has a large Miller capacitance value 107, while a CMOS buffer 108 (FIG. 1(c)), which is made by cascading two of the same CMOS inverters 110 and 111, has a smaller Miller capacitance value 109 that may force a weaker Miller capacitance effect on the timing results. This fact is observed for other CMOS gates as well. Referring to FIG. 1(d), the Miller capacitance from inputs of a multi-input gate to its output ports can vary widely. For instance, for the case of NAND2 gate 112, the Miller capacitance 113 from the input closest to the output in the stack may be larger than the Miller capacitance 114 from the input farthest to the output. In addition, even the transistor size of the CMOS gates can impact the Miller capacitance. Hereinafter, the effect of Miller capacitance on timing will be described in detail for a given a circuit structure, and metrics will be described to determine when the Miller capacitance effect on its timing is significant.

Static Timing Analysis of VLSI Circuits

Figure 2A:
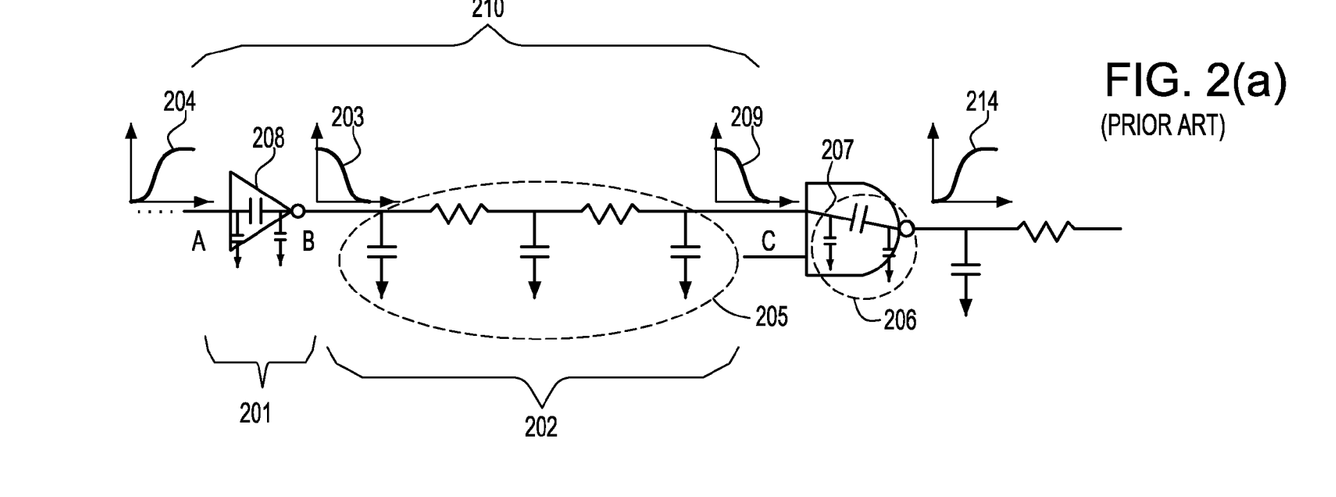
FIG. 2(a) illustrates how a prior art STA break the timing analysis into gate timing analysis and interconnect timing analysis.

Referring to FIG. 2(a), most STA tools break the analysis into two parts: 1) gate timing analysis 201, (i.e., gate propagation delay and output slew calculation), and 2) interconnect timing analysis 202, (i.e., interconnect propagation delay and output slew calculation). The overall delay from input A of the CMOS inverter 208 to the input C of the NAND2 gate 207 is expressed as the sum of the gate delay from input A to the output B of CMOS inverter 208, and interconnect propagation delay from output B of the inverter 208 to the input C of the NAND2 gate 207, as shown in EQ. 1. Therefore, the stage delay 210 is defined as the delay from the voltage waveform 204 at the input of CMOS gate 208, to the voltage waveform 209 at the input of each gate 207 in the fan-out of the primitive gate 208.

$$\text{Delay}_{AC} = \text{Delay}_{AB} + \text{Delay}_{BC} \qquad \text{EQ. 1}$$

Interconnect Timing Analysis

The voltage waveform 209 at the sink terminals of the interconnect network 205 is a function of the voltage waveform 203 at the input of interconnect network 205 (i.e., the voltage waveform 203 at the output of gate 208 connected to the input of the interconnect network), interconnect parasitics 205, and input capacitance 206 of each gate 207 at the outputs of the interconnect network. The interconnect impulse response is a function of the interconnect parasitics, (i.e., the resistances and capacitances of interconnect 205) as well as the input capacitance 206 of all the gates 207 connected to the sink terminals of the interconnect network. The interconnect delay and output slew is calculated by fitting a ramp or a piece-wise-linear waveform to the voltage waveform 203 at the input of the interconnect network and convolving it with the transfer function of the interconnect.

Various Model Order Reduction (MOR) techniques such as those described by L. T. Pillage and R. A. Rohrer, "AWE: Asymptotic waveform evaluation for timing analysis," IEEE Trans. on Computer Aided Design, vol. 9, 1990, pp. 352-366, and those described by A. Odabasioglu, M. Celik, and L. T. Pileggi, "PRIMA: passive reduced-order interconnect macromodeling algorithm," Proceedings of the IEEE/ACM international conference on Computer-Aided Design San Jose, pp. 58-65, 1997, both having been advanced for accurate interconnect timing analysis. Model Order Reduction (MOR) techniques reduce the complexity of the large-scale interconnect networks to smaller ones while preserving their input-output behavior. In other words, the large-scale interconnect networks are reduced to a smaller interconnect network, such that when the same input signal is applied to both, the original interconnect network and the ensuing reduced order model will have their output response closely matched to each other. Note that higher order reduced models display a similar behavior on the original interconnect network while, although they add complexity to the analysis. For instance, a first reduced order model can be very fast to be analyzed while it may destroy the input-output behavior of the system. Therefore, there exists a trade-off between accuracy and speed for determining the order of the reduced model.

As mentioned earlier, the voltage waveform 209 at the output of the interconnect network is also a function of the input capacitance of gates 206 connected to the outputs of the interconnect. Furthermore, the input capacitance 206 of the gates is not fixed and varies during the voltage transition at the input and outputs 209 and 214 of the gate due to the existence of the Miller capacitance between the gate input and outputs. The magnitude of the input capacitance variation is a function of multiple factors including: 1) the voltage waveform at the input of the gate 209; 2) the voltage waveform at the output of gate 214; 3) the relative time difference between the input voltage waveform 209; and the output voltage waveform 214; 4) the Miller capacitance value, and the like. This implies that in order to accurately calculate the voltage waveform at outputs 209 of the interconnect, one needs to first calculate the voltage waveform at outputs 214 of gates 207, at the fan-out of the interconnect network. Further discussion about the Miller capacitance on the timing will be deferred to later.

Gate Timing Analysis

The gate output voltage waveform 203 is a function of several parameters, including the voltage waveform 204 at the input terminal of the gate which is propagated from the previous stages of the design, the output load parasitics 205 and 206, (i.e., the resistance and capacitance of the load 205 as well as the input capacitance 206 of each gate 207 in the fan-out of the primitive gate 208), and the primitive gate 208 timing characteristics. Therefore, given the input voltage waveform 204, the gate timing library, the load parasitics 205, and the input capacitance 206 of the fan-out gates of primitive gate 208, the gate timing analysis calculates the gate output voltage waveform 203 characteristics with respect to those of the gate input voltage waveform 204 (e.g., the gate propagation delay and output slew).

Different gate/driver modeling techniques exist for gate timing analysis. Three well known are based on: (1) the use of delay and slew polynomial equations characterized as a function of input slew, output capacitive load, manufacturing process parameters (e.g., NP-skew, doping concentration, and the like), and environmental parameters (e.g., Vdd, temp); (2) the use of delay and slew tables characterized as a function of input slew and output capacitive load; (3) the use of current source models where the model itself is independent from input events (i.e., the input slew) and output events (i.e., output load).

The first and second modeling techniques are more efficient than the third one. However, they do not accurately capture the effect of Miller capacitance on timing while the third technique does. In the following, highlights of these techniques will be discussed.

Gate Timing Analysis Using Delay and Slew Tables/Equations

Figure 3A:
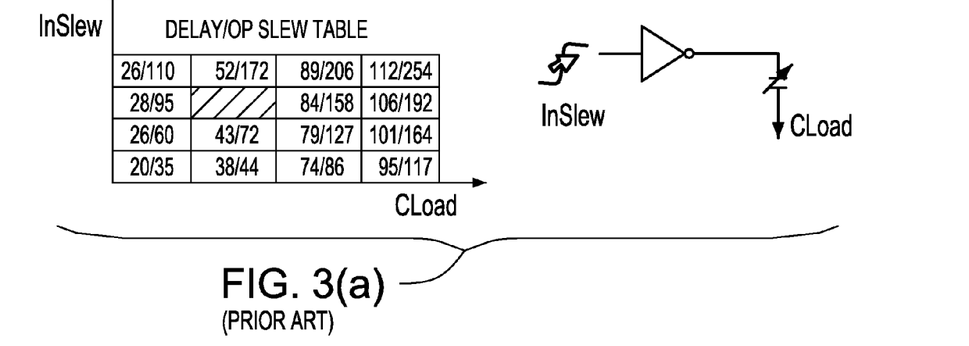
Figure 3B:
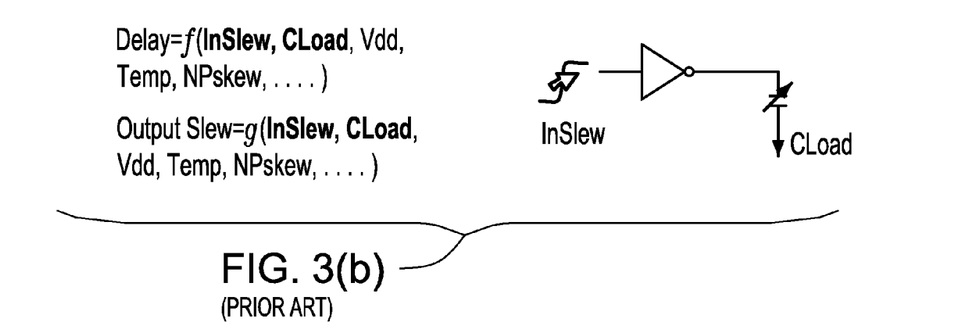

As mentioned earlier, the delay and slew tables (FIG. 3(a)) and equations (FIG. 3(b)) in the first and second modeling techniques are characterized as a function of input slew and output capacitive load. It is assumed that the slew at the input of a gate is given. If the load at the output of the gate is approximated by a capacitive load, using the delay table/equation in the gate library, the gate propagation delay can be simply calculated. In addition, using the slew equation/table in the gate timing library, the gate output slew can, once again, also be simply calculated.

Figure 2B:
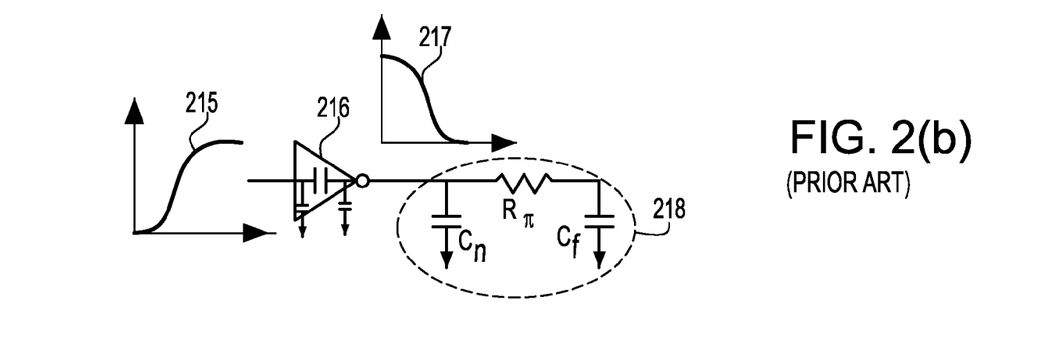
FIG. 2(b) illustrates how in the prior art, the effect of interconnect resistive parasitics is typically considered.
Figure 3C:
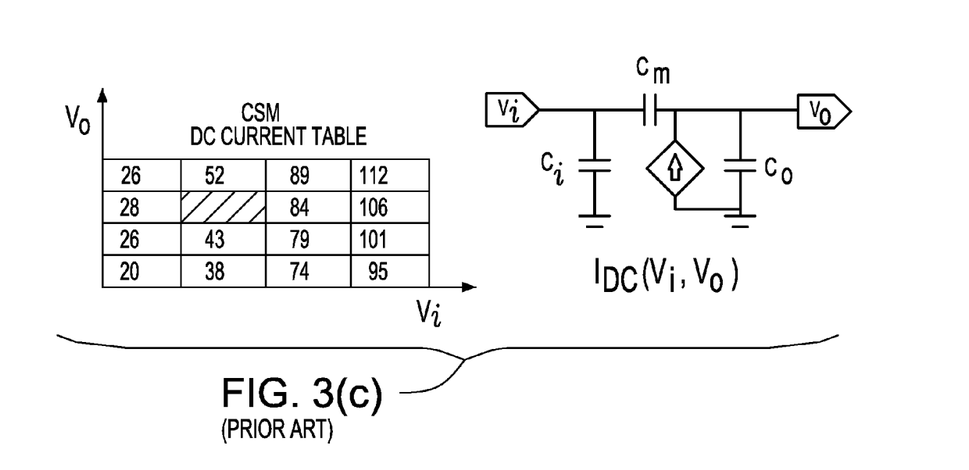

However, in very deep sub-micron (VDSM) technologies, the effect of interconnect resistive parasitics cannot be neglected. Using the sum of all load capacitances as the capacitive load is a simple, yet a quite inaccurate approximation, as described by J. Qian, S. Pullela, and L. Pillage, "Modeling the "effective capacitance" for the RC interconnect of CMOS gates," IEEE Trans. on Computer Aided Design, vol. 13, pp. 1526-1535, 1994. A more accurate approximation for an $n^{th}$ order load seen by the gate/cell (i.e., a load with n distributed capacitances to ground) is to use a reduced order model. For instance, for the case of resistive capacitive interconnects, the load can be approximated by a second order RC-π model, as described by P. R. O'Brien and T. L. Savarino, "Modeling the driving-point characteristic of resistive interconnect for accurate delay estimation," Proc. of International Conference on Computer Aided Design, pp. 512-515, 1989. Equating the first, second, and third moments of the admittance of the real load with the first, second, and third moments of the RC-π load, $C_n$, $R_π$, and $C_f$ 218, in FIG. 2(*b*), are determined. Note that the RC-π values are indeed a function of the input capacitance of any gates in the fan-out of the primitive gate. Using the "effective capacitance" technique, the reduced order model load (e.g., the RC-π load) is approximated by an equivalent capacitance. The delay and slew equations/tables are employed to obtain the gate delay and output transition time, given the slew 215 at the input of the gate and the reduced order RC-π load 218. It is worth mentioning that it is not straightforward to model the effect of the Miller capacitance on timing with the first and second driver modeling techniques, since the models do not explicitly account for the Miller capacitance. Using Current Source Driver Models (FIG. 3(*c*) (i.e., the third technique), which explicitly have the Miller capacitance in the model, one can evaluate the Miller capacitance effect on timing accurately.

Gate Timing Analysis Using Current Source Driver Model

Another form of CMOS driver modeling called the Current Source Driver Models will now be described. There are different types of current source modeling techniques such as the Composite Current Source (CCS) model and the Effective Current Source Model (ECSM), both known in the art, and CSM described by I. Keller, K. Tseng, N. Verghese, "A robust cell-level crosstalk delay change analysis," Proceedings of International Conference on Computer-Aided Design (IC-CAD), pp.147-154. The discussion that follows will be limited to the CSM model. However, it is straightforward to extend the discussion to another current source driver models as well.

A typical CSM model is shown in FIG. 3(*c*). The nonlinear CSM model consists of four elements: a nonlinear voltage-controlled current source driver, IDC(Vin, Vout) (i.e., the gate output DC current as a function of the input Vin and output Vout DC voltage levels) and three parasitic capacitances, i.e., the input capacitance to ground, $C_i$, the output capacitance to ground, $C_o$, and the Miller capacitance from the input to the output, $C_m$. Note that the CSM driver model elements are independent from the output load and the input waveform (or the load connected to the input of the CMOS gate). Given the voltage waveform at the input, the load at the output of the CMOS gate and the CSM driver model of the gate, one may apply a nonlinear simulation to obtain the voltage waveform at the output of the CMOS gate. If properly employed, the CSM driver model will accurately capture the effect of Miller capacitance on timing. However, the nonlinear simulation is more inefficient than the $C_{eff}$ calculation of the first and second driver modeling techniques, as previously discussed. Therefore, one may want to use the CSM modeling and a nonlinear simulation when the accuracy of the CSM driver modeling makes it necessary for accuracy purposes. Thus, when the Miller capacitance effect on timing is significant, it requires using the CSM modeling technique to achieve better accuracy.

Conventional Static Timing Analysis

STA propagates voltage waveforms from the circuit primary inputs through gates and interconnects to calculate the earliest/latest signal arrival times/voltage waveforms at the circuit primary outputs. Therefore, at any point of the circuit, if the voltage waveform at the input of the gate is calculated, STA performs a gate timing analysis to determine the voltage waveform at the output of the gate, using any of the driver modeling techniques previously described. In addition, at any point within the circuit, if the voltage waveform at the input of an interconnect network is calculated, STA employs interconnect timing analysis algorithms to calculate the voltage waveforms at the outputs of the interconnect network. Again, there is trade-off between accuracy and runtime to determine the order of the interconnect-reduced models for the interconnect timing analysis. STA has a linear complexity with respect to the number of the gates in a design by propagating the arrival times/required arrival times/voltage waveforms through the timing graph assuming that the timing stages are independent from each other (i.e., it considers a fixed load for the input capacitance of the gates in the fan-out of the primitive gates, while calculating the RC-π load as well as performing the interconnect timing analysis).

Figure 4:
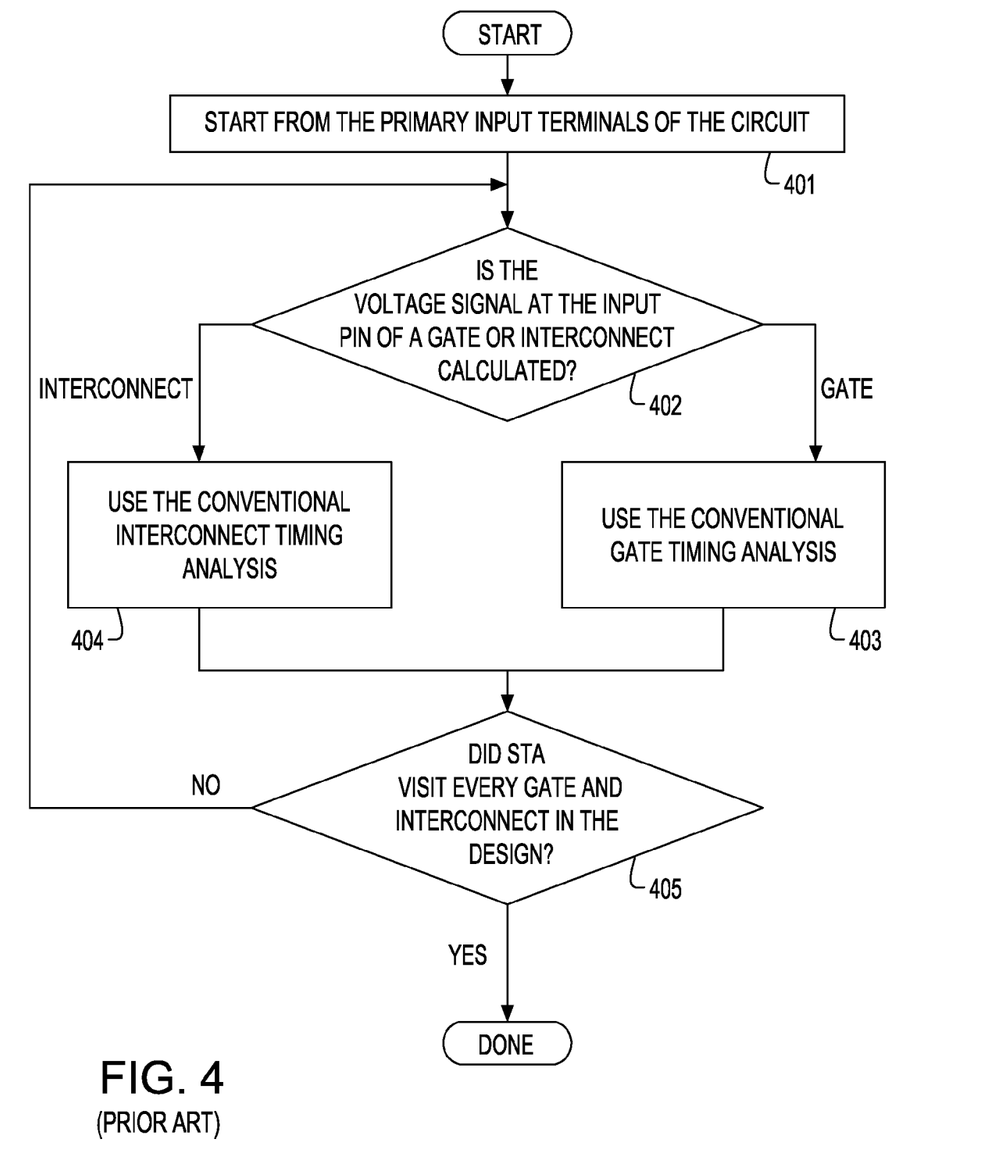
FIG. 4 shows a flowchart of a conventional STA.

Referring now to the flowchart of a conventional STA flow shown in FIG. 4, in step 401, STA always begins by propagating the voltage waveforms from the circuit primary inputs toward the circuit primary outputs using the voltage waveforms at the primary input of the circuit. Next, for every gate or interconnect in the design, STA runs a gate timing analysis and interconnect timing analysis, respectively. Thus, as shown in step 402, STA checks if the voltage waveforms at the input of the next gate or next interconnect in the path are calculated. If the voltage waveform at the input of a gate is calculated, as shown in step 403, using the gate timing model, the input slew and the output load reduced order model (assuming that the input capacitance of the gates in the fan-out of the primitive gates have fixed values), STA runs the $C_{eff}$ algorithm described earlier and calculates the gate propagation delay and output slew. If the voltage waveform at the input of an interconnect network is calculated, as shown in step 404, STA runs the interconnect timing analysis using the interconnect parasitics, the input slew and a fixed value for the input capacitance of each fan-out gate of the interconnect, and calculates the interconnect propagation delay and output slew at every output of the interconnect network. In step 405, STA checks if the gate and interconnect timing analysis has been performed for every gate and interconnect of the design and, thereby, the arrival time at every primary outputs of the design is calculated. If this is true, the static timing analysis of the circuit is complete. Otherwise, STA branches back to step 402 and continues.

From the aforementioned described considerations, it becomes evident that there exists a need in industry for an improved timing analysis in the process of propagating voltage waveforms/signal arrival times, such that for circuits where the Miller capacitance effect on timing is significant, a new interconnect and gate timing analysis flow is invoked, while for circuits where the Miller capacitance effect on timing is not significant, conventional gate and interconnect timing analysis algorithms are preferably employed. Such dual choice helps to maintain a linear STA run-time with respect to the number of gates in the design while, at the same time, increasing the accuracy of timing results with respect to a detailed SPICE analysis.

OBJECTS AND SUMMARY OF THE INVENTION

Accordingly, it is an object of the present invention to provide a system and method enabling an STA to achieve highly accurate voltage waveforms by using a timing analysis flow that factor in the effect of the Miller capacitance of gates and interconnects.

It is another object of the invention to run an efficient STA when the Miller capacitance effect of a CMOS gate on timing is determined to be significant.

In one embodiment of the invention, there is a provided a method for performing a static timing analysis (STA) on a circuit that includes gates with interconnects by incorporating the effect of Miller capacitance on timing.

In the preferred embodiment, a primitive gate is selected and its respective fan-out gates, interconnects attached to the primitive gate's output and interconnects attached to the output of each respective fan-out gate are determined. Using a metric capable of determining if the Miller capacitance effect of the CMOS gate on timing of that of its fan-out gate and interconnect timing is significant, for each fan-out gate of a primitive gate, it is first determined if its Miller capacitance effect on timing is significant. If yes, the gate is replaced with nonlinear driver model. If its Miller capacitance effect on timing is not significant, the gate is replaced preferably with a fixed capacitance. Next, if at least one of the fan-out gates is replaced with a nonlinear driver model, then the primitive gate is replaced with its corresponding nonlinear model as well. Next, a nonlinear timing simulation is performed on the circuit that generates voltage waveforms at the output of the primitive gate and the input of its fan-out gates. These voltage waveforms incorporate the effect of the Miller capacitance. However, if none of the fan-out gates are replaced with the nonlinear driver model, a conventional gate and interconnect timing analysis is preferably employed.

In a second embodiment of the invention, a method is provided for performing a static timing analysis (STA) on a VLSI circuit consisting of a plurality of gates and interconnects, the method incorporating the effect of the Miller capacitance on the timing of the VLSI circuit. A primitive gate is selected along with its respective fan-out gates and interconnects attached to the primitive gate's output, as well as the interconnects attached to the output of each respective fan-out gate. Using the predetermined metric, for each fan-out gate, it is first determined if its Miller capacitance effect on timing is significant. If yes, the gate is replaced with a nonlinear driver model. However, if its Miller capacitance effect on timing is not significant, the gate is replaced with a fixed or dynamic capacitance. Next, if at least one of the fan-out gates is replaced with a nonlinear driver model, the primitive gate is likewise also replaced with its corresponding nonlinear model as well. Then, a nonlinear timing simulation is performed on the circuit to generate voltage waveforms at the output of the primitive gate and input of its fan-out gates. These voltage waveforms incorporate the effect of the Miller capacitance. However, if none of the fan-out gates is replaced with the nonlinear driver model, a conventional gate and interconnect timing analysis is preferably employed to increase the efficiency of the STA run time. Next, the above procedure is employed on each gate of the VLSI chip and the results are merged, i.e., the voltage waveforms are propagated from the VLSI circuit primary inputs towards the VLSI circuit primary output incorporating the Miller capacitance effect on the timing.

The above described STAs of the VLSI circuit are performed at different levels of accuracy during the design flow by setting parameters in the metrics to appropriate values, preferably, by starting at a lower accuracy level at initial stages of the design flow and gravitating towards higher accuracy levels at later stages thereof.

BRIEF DESCRIPTION OF THE DRAWINGS

The accompanying drawings, which are incorporated in and which constitute part of the specification, illustrate the presently preferred embodiments of the invention which, together with the general description given above and the detailed description of the preferred embodiment given below serve to explain the principles of the invention.

FIGS. 1(b)-1(d) illustrate how a typical Miller capacitance value and its effect on timing differ for various types of different CMOS gates in a library, e.g., inverters, buffers, and the like.

FIG. 3 shows prior art delay and slew tables (FIG. 3(a)) and equations (FIG. 3(b)), as well as current source driver models (FIG. 3(c)) in a first, second, and third modeling techniques.

DETAILED DESCRIPTION OF A PREFERRED EMBODIMENT

The present invention and the various features and advantageous details thereof are explained more fully with reference to the non-limiting embodiments that are illustrated in the accompanying drawings and detailed in the following description.

The Static Timing Analysis Flow

Due to the effect of Miller capacitance on timing, the arrival time/voltage waveforms calculated at the circuit primary outputs using the conventional STA flow may be found to be erroneous.

Figure 5A:
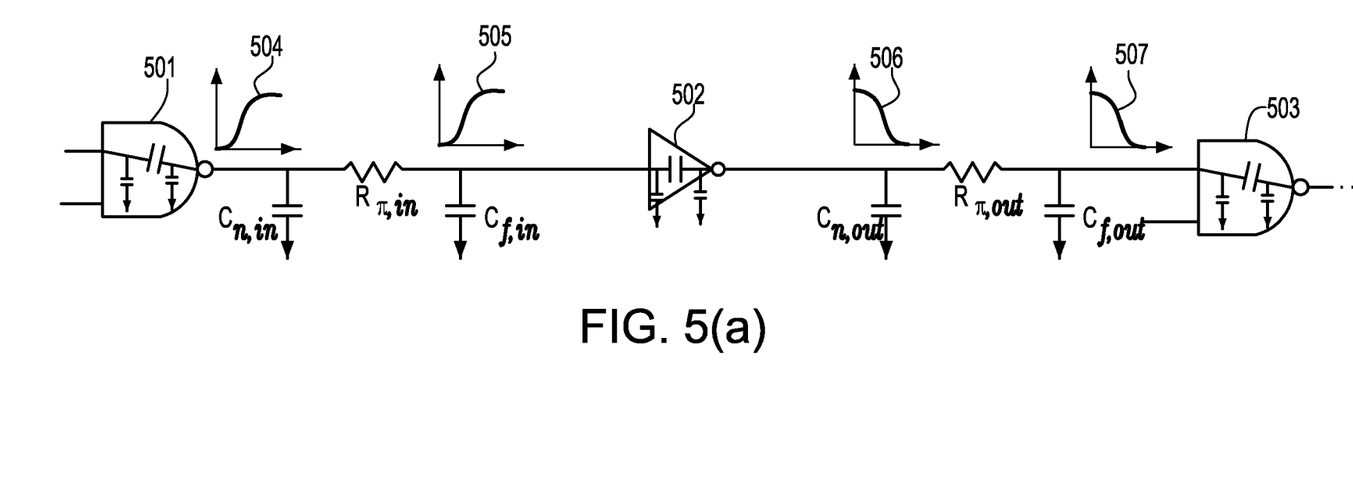
FIG. 5(a) shows an illustrative circuit consisting of CMOS gates, interconnects and an inverter, represented by its equivalent CSM model (FIG. 5(b)), the circuit being utilized to illustrate how the Miller capacitance is taken into account in a preferred embodiment of the present invention.

Referring to FIG. 5(a), a portion of a VLSI circuit design is illustrated consisting of two CMOS NAND2 gates 501 and 503, and one CMOS inverter 502, shown as being interconnected with reduced order RC-π loads. Assuming now that the Miller capacitance of the CMOS inverter 502 is large (i.e., has a significant effect on timing) while the Miller capacitance value of NAND2 gates 501 and 503 does not. In addition, and without loss of generality, it is assumed that the voltage waveform 504 at the output of NAND2 gate 501 is calculated accurately by propagating the voltage waveforms from previous stages of the design. In a conventional STA, the interconnect timing analysis algorithm calculates the voltage waveform 505 at the input of the inverter 502 based on the voltage waveform at the input of the interconnect network 504 and a fixed input capacitance of the CMOS inverter (preferably obtained from the gate library). Next, the voltage waveform 505 at the input of inverter 502 propagates to output 506 of the inverter e.g., using the gate timing analysis algorithm explained previously. This process continues until the voltage waveforms are propagated to the primary outputs of the VLSI circuit. However, if the value of the CMOS inverter Miller capacitance is significant, a traditional STA may end up with a large error in the timing results. In other words, if the Miller capacitance of the CMOS inverter 502 is large, the input capacitance of the inverter varies during the voltage transitions at the two terminals of the Miller capacitance 505 and 506. Therefore, before the voltages at the two terminals of the inverter are calculated, the value of the effective input capacitance of the inverter cannot be accurately determined. This affects the interconnect timing analysis results, as well as the voltage waveform at the output of the interconnect network 505. Subsequently, the voltage waveform at the output of inverter 506 needs to be modified. This infers that for an accurate voltage waveform calculation in the presence of Miller capacitance effect in conventional STA, an iterative approach is required, which renders the timing analysis inefficient. Alternatively, one needs to know the voltage waveform 506 at the output of the CMOS inverter 502 before calculating the voltage waveform 505 at the input of the inverter.

Hence, the new flow advantageously determines the voltage waveform at the output 506 of the inverter 504 using the voltage waveform at the output of the fan-in gate of the inverter. Next, the voltage waveform at the input of the inverter 505 is calculated using the voltage waveform at the output of the inverter 506, and the waveform at the output of NAND2 504.

Next, metrics are derived to determine if the Miller capacitance has a significant effect on the interconnect and gate timing results. Subsequently, the new interconnect and gate timing analysis flow is invoked that is capable of capturing the Miller capacitance effect on timing.

Significance of Miller Capacitance on Gate and Interconnect Timing Analysis

As mentioned earlier, in a conventional gate and interconnect timing analysis, the input capacitances of the gates in the fan-out of the primitive gate are modeled by fixed capacitance values. Therefore, the feedback from the fan-put gates outputs to the fan-in gate and interconnect timing analysis is ignored. When the effect of Miller capacitance on timing is significant, the delay and slew calculated in the conventional gate and interconnect timing analysis is known to be erroneous. Following, two metrics will be described which determine if the Miller capacitance effect on timing is significant.

In the first section, the Miller capacitance of the CMOS gates is discussed. Significance of the Miller capacitance effect on the timing is a function of various parameters, including the Miller capacitance of the gate, the voltage waveform at the input of the Miller capacitance (i.e., implicitly a function of the load connected to input of the gate) and the voltage waveform at the output of the Miller capacitance (i.e., implicitly a function of the load connected to the output of the Miller capacitance). In the following section, some of these factors and present metrics will be reviewed showing how to determine if the effect of Miller Capacitance of a CMOS Gate on Timing is Significant.

Figure 5B:
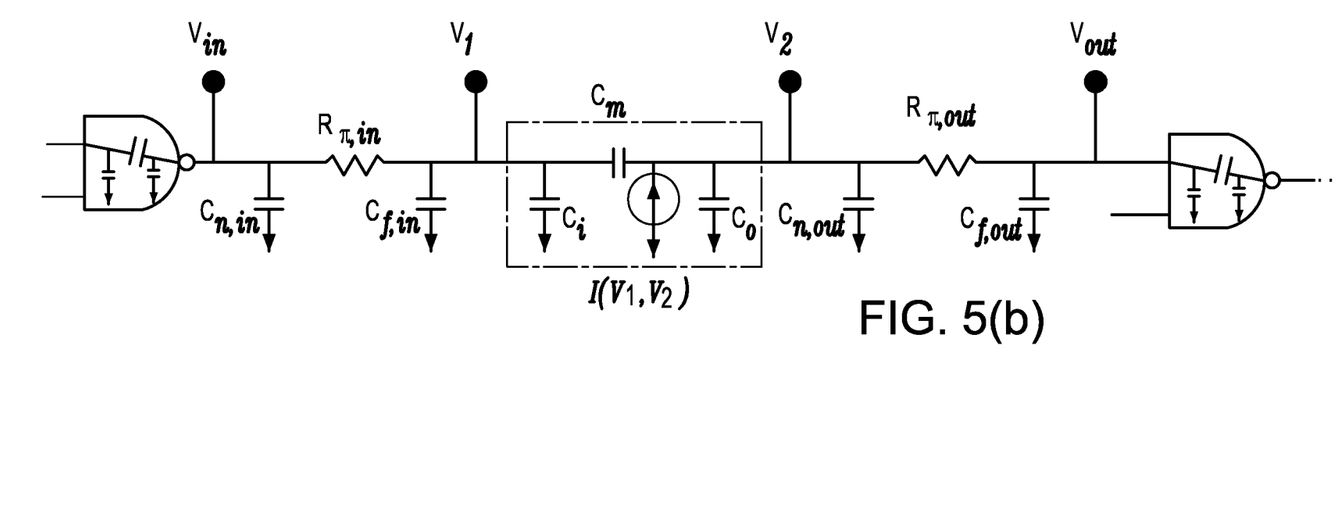

Consider the circuit shown in FIG. 5(*a*). For simplicity, an RC-π segment is shown to represents the interconnect. CMOS inverter 502 in FIG. 5(*a*) is replaced by its equivalent CSM model as shown in FIG. 5(*b*). By writing the KCL equations at the input of the inverter in FIG. 5(*b*) and collecting terms, the following equation is obtained:

$$\frac{V_1(t)}{R_{\pi,in}} + (C_{f,in} + C_{in} + C_m)\frac{d}{dt}V_1(t) - \frac{V_{in}(t)}{R_{\pi,in}} - C_{in}\frac{d}{dt}V_2(t) = 0 \quad \text{EQ. 2}$$

By dividing the above equation by $(C_{f,in}+C_{in}+C_m)$, EQ. 2 can be represented as follows:

$$\frac{V_1(t)}{R_{\pi,in}(C_{f,in} + C_{in} + C_m)} + \frac{d}{dt}V_1(t) - \quad \text{EQ. 3}$$

$$\frac{V_{in}(t)}{R_{\pi,in}(C_{f,in} + C_{in} + C_m)} - \frac{C_m}{(C_{f,in} + C_{in} + C_m)}\frac{d}{dt}V_2(t) = 0$$

EQ. 3 illustrates the dependency of $V_1(t)$ to $V_2(t)$ due to the Miller capacitance. If the Miller capacitance value is small, the feedback from $V_2(t)$ to $V_1(t)$ can be ignored. Thus, if $$\alpha = \frac{C_m}{(C_{f,in} + C_{in} + C_m)}$$

is small, the input-capacitance value of the CMOS gates is advantageously approximated with a fixed number; therefore, the conventional timing analysis is accurate. If KCL is applied at the output of the CMOS inverter in FIG. 5(*b*), after collecting terms, one obtains EQ 4:

$$\frac{V_2(t)}{R_{\pi,out}} + (C_{n,out} + C_o + C_m)\frac{d}{dt}V_2(t) - \quad \text{EQ. 4}$$

$$\frac{V_{out}(t)}{R_{\pi,out}} - C_m\frac{d}{dt}V_1(t) - I(V_1, V_2) = 0$$

When the above equation is divided by $(C_{n,out}+C_o+C_m)$, then EQ 4 is represented as follows:

$$\frac{V_2(t)}{R_{\pi,out}(C_{n,out} + C_o + C_m)} + \frac{d}{dt}V_2(t) - \frac{V_{out}(t)}{R_{\pi,out}(C_{n,out} + C_o + C_m)} - \quad \text{EQ. 5}$$

$$\frac{C_m}{(C_{n,out} + C_o + C_m)}\frac{d}{dt}V_1(t) - \frac{I(V_1, V_2)}{(C_{n,out} + C_o + C_m)} = 0$$

EQ. 5 shows the dependency of $V_1(t)$ to $V_2(t)$ due to the Miller capacitance presence. Again, if the Miller capacitance value is small, the feedback from $V_2(t)$ on $V_1(t)$ can be ignored. Thus, if $$\beta = \frac{C_m}{(C_{n,out} + C_o + C_m)}$$

is small, the input-capacitance value of the CMOS gates can be approximated with a fixed number and the conventional timing analysis is accurate. As a result, if any of the following criteria is satisfied, the effect of the Miller capacitance on interconnect timing analysis can be ignored.

$$\beta = \frac{C_m}{(C_{n,out} + C_o + C_m)} < \lambda \qquad \text{EQ. 6}$$

or $$\alpha = \frac{C_m}{(C_{f,in} + C_{in} + C_m)} < \gamma$$

where $C_m$ is the Miller capacitance of the CMOS gate, $C_{in}$ is the input capacitance of the gate to ground, $C_o$ is the output capacitance of the gate to ground, $C_{f,in}$ is approximately half of the total capacitance of the wire connected to the input of the gate, and $C_{n,out}$ is approximately half of the total capacitance of the wire connected to the output of the gate. $\lambda$ and $\gamma$ are user specified values between 0 and 1.

Next, if one multiplies EQ. 2 by $R_{\pi,in}$, EQ 2 can be rewritten as follows:

$$V_1(t) + R_{\pi,in}(C_{f,in} + C_{in} + C_m)\frac{d}{dt}V_1(t) - \qquad \text{EQ. 7}$$

$$V_{in}(t) - R_{\pi,in}C_m\frac{d}{dt}V_2(t) = 0$$

EQ. 7 shows the dependency of $V_{in}(t)$ to $V_2(t)$ due to the Miller capacitance presence. This dependency decreases when either $R_{\pi,in}C_m$ is small or d/dt $V_2(t)$ is small. d/dt $V_2(t)$ being small implies that while $V_{in}(t)$ is transitioning, the $V_2(t)$ should be steady. Thus, if the delay between $V_{in}(t)$ and $V_2(t)$ is sufficiently large, $V_2(t)$ will be steady while $V_{in}(t)$ remains in transition.

It is also known that the delay between $V_{in}(t)$ and $V_2(t)$ is proportional to $R_{\pi,in}(C_{f,in}+C_{in}+C_m)$. Therefore, the dependency between $V_{in}(t)$ and $V_2(t)$ decreases, if $$\eta = \frac{R_{\pi,in}C_m}{R_{\pi,in}(C_{f,in} + C_{in} + C_m)} = \frac{C_m}{(C_{f,in} + C_{in} + C_m)} < \lambda \qquad \text{EQ. 8}$$

where $C_m$ is the Miller capacitance of the CMOS gate, $C_i$ is the input capacitance of the gate to ground, and $C_{f,in}$ is approximately half of the total capacitance of the wire connected to the input of the gate. $\alpha$ is a user specified value between 0 and 1.

EQ. 6 is a superset of EQ. 8. Therefore, EQ. 6 shows the criteria which determine when the effect of Miller capacitance on gate and interconnect timing analysis is significant.

Evidently, there is a trade off between efficiency and accuracy when choosing $\lambda$ and $\gamma$ parameter values. One can select different $\lambda$ and $\gamma$ values at different stages of the design flow, starting with a large $\lambda$ and $\gamma$ values but choosing smaller ones when proceeding from earlier design stages toward the sign-off stage. These values are designer, technology, "step in design flow" dependent. The designer, therefore, selects these parameter values based on a predetermined accuracy. One can run a few test cases for each class of designs and in each technology node to obtain the parameter values. Accordingly, deriving these parameter values is rather straight-forward, but must be tailored to a particular design and technology. Of course, one may use other metrics to determine if the Miller capacitance effect on timing is significant or not.

Gate and Interconnect Timing Analysis Flow

Figure 6A:
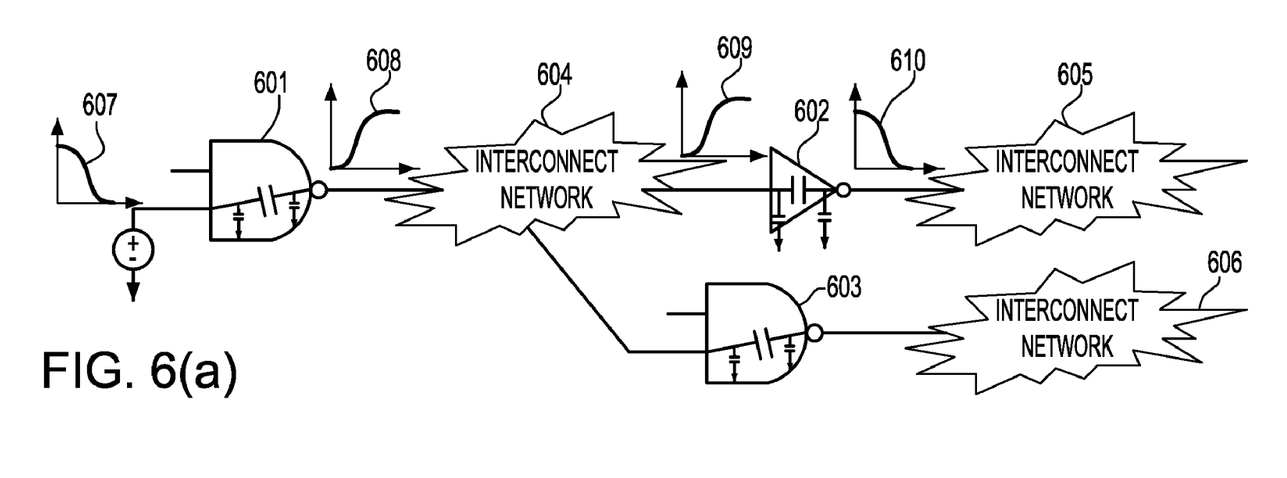
FIG. 6(a) illustrates a circuit consisting of two interconnected NAND gates and one inverter having a significant Miller capacitance effect on the timing, while the Miller capacitance effect of the NAND gate on timing is not significant.

As an example, consider a partition of a VLSI circuit shown in FIG. 6(a). The circuit consists of two CMOS NAND2 gates 601, and 603, and one CMOS inverter 602, which are interconnected as shown in FIG. 6(a). Assuming that the voltage waveform 607 at the input of NAND2 gate 601 is calculated accurately, and one is interested in the gate timing analysis of NAND2 gate 601 and the timing analysis of interconnect 604. Assuming that by using EQ. 6, it is determined that the Miller capacitance of the CMOS inverter 602 has a significant effect on the gate timing analysis of NAND2 gate 601 and on the timing analysis of interconnect 604, while the Miller capacitance of NAND2 gate 603 is not significant.

Figure 6B:
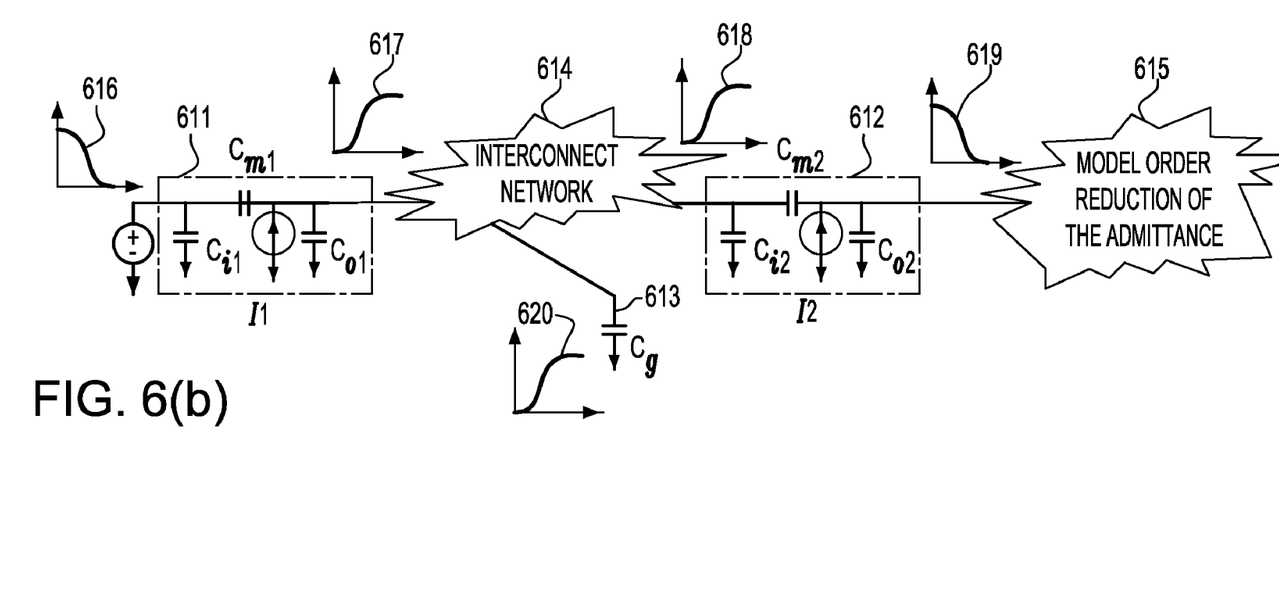
FIG. 6(b) shows a gate and interconnects timing analysis flow, according to the invention, for the circuit depicted in FIG. 6(a), in which the Miller capacitance effect of one gate in the fan-out of the primitive gate is known to affect the timing.

Referring to FIG. 6(b), a new gate and interconnect timing analysis flow is performed for the circuit in which the Miller capacitance effect of even one gate in the fan-out of the primitive gate is significant on timing. For this, NAND2 gate 601 (i.e., the one to which the gate timing analysis is to be performed) is replaced by its CSM model 611. In addition, since the Miller capacitance effect of the CMOS inverter 602 is significant, it is replaced by its CSM model 612. However, NAND2 gate 603 (i.e. the gates having a minimal Miller capacitance effect on timing) is replaced with a fixed capacitance value which is obtained from its timing library. In addition, to capture the effect of inverter's 602 output load 605 on the timing of NAND2 601 and the interconnect 604 attached to it, the interconnect load 605 is replaced by its reduced order model equivalent, 615 such as RC-π load.

Next, using the nonlinear circuit shown in FIG. 6(b) and the input voltage waveform 616, a nonlinear simulation is run and the voltage waveform 617 is calculated at the output of NAND2 gate 611. Also, NAND2 gate 611 delay and output slew are both calculated. Unlike the conventional STA which determines the voltage waveform at the sink terminals of the interconnect network 614, in the new flow, the voltage waveform 619 at the outputs of the gates 612 (that has a significant Miller capacitance effect on timing) is calculated. Next, using the voltage waveform 619 at the output of the fan-out gates 612 and the voltage waveform at the output of the primitive gate 608, the voltage waveforms 618 and 620 and interconnect delay and output slew at the outputs of the interconnect network 614 are calculated accurately. Note that calculation of voltage waveforms 619 at the output of the fan-out gates helps to accurately calculate the voltage waveforms at the sink terminals of the interconnect 618 and 620 due to the Miller capacitance effect.

In order to increase the accuracy level, higher order reduced models (ROM) can be calculated for the load 615 at the output of the CMOS inverter 612. However, this may increase the run-time of the analysis. Note that the running nonlinear simulation on the circuit in FIG. 6(b) for calculating the gate and interconnect timing is not as efficient as the ones in conventional STA. Hence, it will be advantageous to use conventional STA algorithms for the cases in which the Miller capacitance effect on gate and interconnect timing is not significant (which can be determined using EQ. 6) and use the above nonlinear simulation for the remainder.

In summary, following are the steps to calculate the gate and interconnect timing analysis when the Miller capacitance of even one gate in the fan-out of the primitive gate is significant on timing:

1. Replace gate 601 on which to perform the gate timing analysis with its nonlinear driver model 611.
2. Using EQ. 6, for every gate 602 and 603 in the fan-out of the primitive gate 601, if its Miller capacitance effect is significant on timing, replace gate 602 with its nonlinear driver model 61. However, if the Miller capacitance effect is not significant, replace the gate 603 with a fixed capacitive load 613 which is obtained from the gate library.

3. For every gate having a significant Miller effect, attach the reduced order model 615 of its real load 605 to the output of its non-linear driver model 612.
4. Using the circuit constructed above (i.e., FIG. 6(*b*)) and the input voltage waveform 607 or 616 to the primitive gate 611. Run a non-linear simulation and calculate the voltage waveform 617 at the output of primitive gate 611.
5. Using the circuit constructed above (i.e., FIG. 6(*b*)), the voltage waveform 617 at the output of the primitive gate 611 is determined. Calculate the voltage waveform 619 at the output of every gate 612 at the fan-out of the primitive gate.
6. Using the voltage waveforms obtained in steps 4 and 5, calculate the voltage waveforms 618 and 620 at every sink terminals of the interconnect network.

Static Timing Analysis Flow

As mentioned previously, conventional STAs have a linear complexity with respect to the number of the gates in a design by propagating the arrival times/required arrival times/voltage waveforms through the timing graph assuming that the timing stages are independent from each other (it considers a fixed load for the input capacitance of the gates in the fan-out of the primitive gates while performing a gate and interconnect timing analysis). However, if the Miller capacitance effect on timing is significant, the conventional STA may provide erroneous results. Therefore, hereinafter, the new gate and interconnect timing analysis steps for these cases will be described.

As pointed out earlier, the proposed timing analysis steps may not be as efficient as the ones obtained by running a conventional STA since it requires non-linear simulation, in which case, one might advantageously use the conventional STA algorithms for the circuit in cases where the Miller capacitance effect is not significant.

Figure 7:
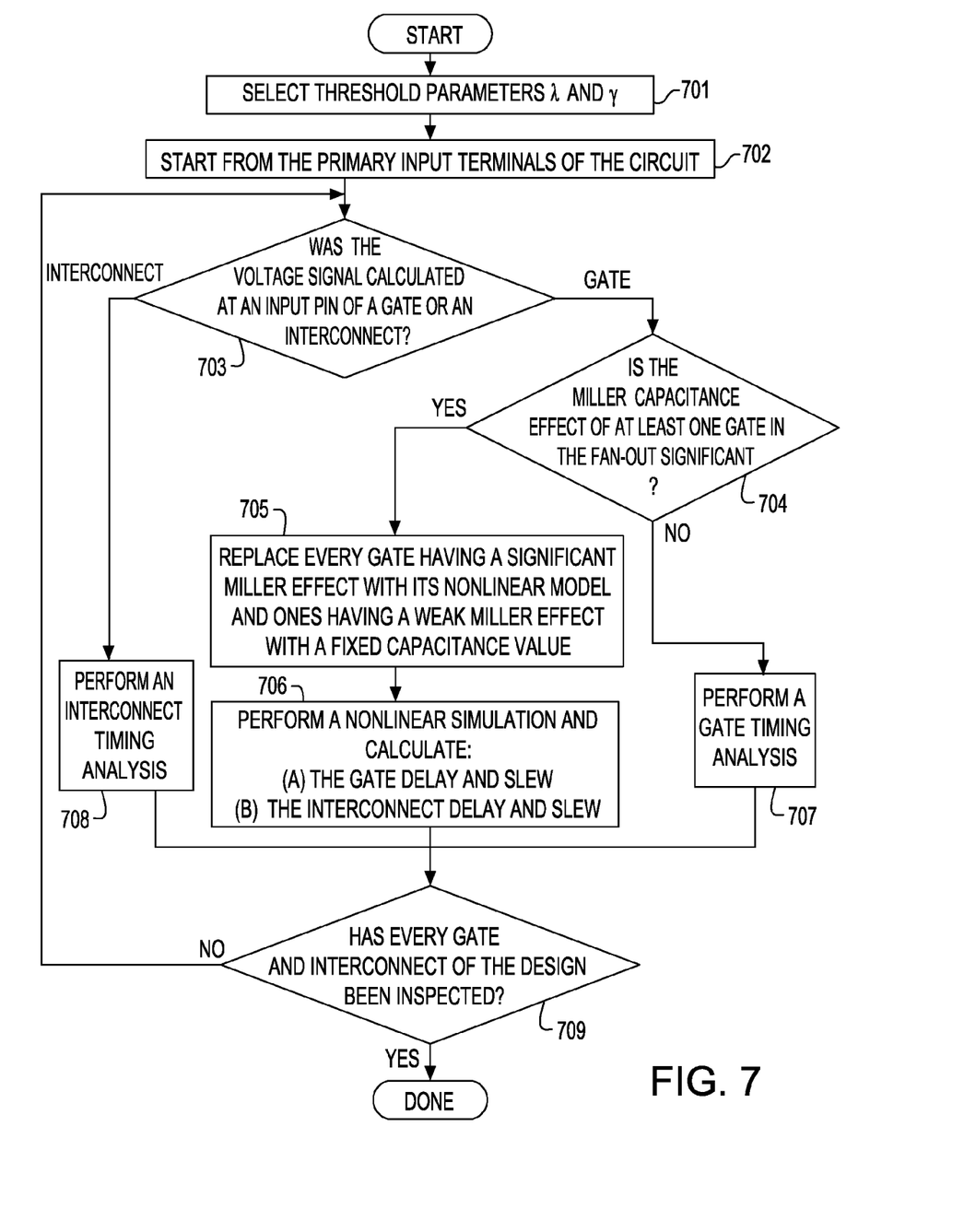
FIG. 7 shows a high level flow chart of the STA flow that incorporates the effect of the Miller capacitance, according to the preferred embodiment of the present invention.

Hence, the new STA flow considering the Miller capacitance effect is shown in FIG. 7. In step 701, STA obtains $\lambda$ and $\gamma$ values as a input from the user. These values are designer, technology, "step in design flow" dependent and a designer can choose these parameter values based on his/her own desired accuracy. One can choose different $\lambda$ and $\gamma$ values in different stages of the design flow, starting with a large $\lambda$ and $\gamma$ values but choosing smaller ones as one proceeds from earlier design stages toward the sign-off stage.

Step 702 of the preferred flow of the invention is the same as step 401 of the conventional STA, which begins by propagating the voltage waveforms from the circuit primary inputs toward the circuit primary outputs using the asserted voltage waveforms at the primary input of the circuit. As shown in step 703, STA determines if the voltage waveforms at the input of the next gate or next interconnect in the design are calculated. If the voltage waveform at the input of a gate is calculated and the gate timing analysis has not yet been performed, the STA checks to find out if even for one gate in the fan-out of the primitive gate, its Miller capacitance has a significant effect on timing as shown in step 704 (i.e. using EQ 6 and the $\lambda$ and $\gamma$ values which is entered in step 701). If the answer to the step 704 is yes, using the nonlinear circuit as previously explained in (steps 705 and 706), STA calculates the gate timing and the timing of the interconnects connected to the output of the primitive gate. However, if the answer to the step 704 is no, STA will use the conventional gate timing analysis as in step 707. In addition, at step 703, if STA finds out that the voltage waveform at the input of an interconnect network is given and the interconnect timing is not yet done, it will run the conventional interconnect timing analysis as shown in step 708. In 709, STA queries to find if it has visited every gate and interconnect in the design, and thereby, the timing results at every point in the design are updated. If the answer is positive, then the STA run is deemed complete. However, if the answer is negative, STA will go back to step 703 and continue.

Finally, the present invention can be realized in hardware, software, or a combination of hardware and software. The present invention can be realized in a centralized fashion in one computer system or in a distributed fashion where different elements are spread across several interconnected computer systems. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein.

The present invention can also be embedded in a computer program product, which comprises all the features enabling the implementation of the methods described herein, and which—when loaded in a computer system—is able to carry out these methods.

Computer program means or computer program in the present context mean any expression, in any language, code or notation of a set of instructions intended to cause a system having an information processing capability to perform a particular function either directly or after conversion to another language, code or notation and/or reproduction in a different material form.

While the invention was described by means of a simple illustrative example, it is to be understood that one of ordinary skill in the art can extend and apply this invention in many obvious ways. It should be understood, however, that the description, while indicating preferred embodiments of the present invention and numerous specific details thereof, is given by way of illustration and not of limitation. Many changes and modifications may be made within the scope of the present invention without departing from the spirit thereof, and the invention includes all such modifications.

What is claimed is:

1. A method for accurately timing an integrated circuit (IC) incorporating effects of Miller capacitance, the IC consisting of a plurality of stages consisting of gates and interconnects, the method comprising:
   a) selecting a primitive gate and its respective fan-out gates, first interconnects being attached to the primitive gate output and second interconnects being respectively connected to each of the fan-out gates outputs;
   b) replacing the selected primitive gate with its nonlinear model equivalent, and replacing selected ones of the respective fan-out gates with their nonlinear model equivalents maintaining the fan-out gates connected to their respective second interconnects and replacing the non-selected respective fan-out gates with a linear capacitance;
   c) performing a simulation on the modified IC said simulation being executed by a computer, generating voltage waveforms at the output of the selected primitive gates, propagation delays or transition times at an output of the primitive gate and an input of its fan-out gates;
   d) propagating the generated voltage waveforms, propagation delays or transition times to a next stage thereof, and e) repeating steps a) through c) until all the primary outputs of the IC are reached.

2. The method as recited in claim 1, wherein when said gate and each of its respective fan-out gates does not have said predetermined Miller capacitance effect on timing, then its respective fan-out gates are replaced with a capacitance.

3. The method as recited in claim 2, wherein said replaced capacitance is selected from a group consisting of a fixed capacitance and a dynamic capacitance.

4. The method as recited in claim 1, wherein when if none of the fan-out gates have the predetermined Miller capacitance effect on timing, then a gate and interconnect timing analysis is performed.

5. The method as recited in claim 1, wherein said nonlinear model is a driver model.

6. The method as recited in claim 5, wherein said nonlinear driver model is comprised of three parasitic capacitances:
   a) an input capacitance to ground;
   b) an output capacitance to ground;
   c) the Miller capacitance of said gate's input to output; and
   d) a voltage-controlled current source in parallel with said output capacitance to ground.

7. The method as recited in claim 1, wherein said interconnects are comprised of resistances and capacitances.

8. The method as recited in claim 1, wherein the predetermined Miller capacitance effect on timing is given by equations $$\alpha = \frac{C_m}{(C_{f,in} + C_{in} + C_m)} > \gamma$$

and $$\beta = \frac{C_m}{(C_{n,out} + C_o + C_m)} > \lambda$$

wherein
   $C_m$ is the Miller capacitance of the gate,
   $C_{in}$ is the input capacitance of the gate to ground,
   $C_o$ is the output capacitance of the gate to ground,
   $C_{f,in}$ is approximately half of the total capacitance of the interconnect to an input of the gate,
   $C_{n,out}$ is approximately half of the total capacitance of the output interconnect to the gate; and
   $\lambda$ and $\gamma$ are specified values ranging from 0 and 1.

9. A method of performing a static timing analysis (STA) on a VLSI circuit chip consisting on a plurality of gates and interconnects, incorporating the Miller capacitance effect on timing of the VLSI circuit chip, comprising:
   a) selecting a primitive gate and its respective fan-out gates, the interconnects attached to the primitive gate output and the interconnects connected to each of said fan-out gates' outputs;
   b) replacing the primitive gate and each of its respective fan-out gates having a predetermined Miller capacitance effect on the timing with its respective nonlinear model equivalent;
   c) performing a simulation on the modified VLSI circuit of step b) that generates voltage waveforms said simulation being executed by a computer, propagation delay or transition times at the output of the primitive gate and the input of its fan-out gates that incorporate the predetermined Miller capacitance effect;
   d) propagating the voltage waveforms, propagation delays or transition times from the VLSI circuit primary inputs towards the VLSI circuit primary output to a next stage thereof, and
   e) repeating steps a) through d) until primary outputs of the VLSI circuit chip are reached.

10. The method of claim 9, further performing the STA of the VLSI circuit at different levels of accuracy during the design flow, starting with lower accuracy level at initial stages of the design flow and higher accuracy levels at later stages thereof.

11. The method of claim 9, wherein the predetermined Miller capacitance effect on timing is given by equations $$\alpha = \frac{C_m}{(C_{f,in} + C_{in} + C_m)} > \gamma$$

and $$\beta = \frac{C_m}{(C_{n,out} + C_o + C_m)} > \lambda$$

wherein
   $C_m$ is the Miller capacitance of the gate,
   $C_{in}$ is the input capacitance of the gate to ground,
   $C_o$ is the output capacitance of the gate to ground,
   $C_{f,in}$ is approximately half of the total capacitance of the interconnect to an input of the gate, $C_{n,out}$ is approximately half of the total capacitance of the output interconnect to the gate: and
   $\lambda$ and $\gamma$ are specified values ranging from 0 and 1.

12. The method of claim 11, wherein said $\lambda$ and $\gamma$ are set to 1 during initial stages of the design flow and progressively, decreasing towards 0 for later stages of the design flow.

13. The method of claim 11, wherein said $\lambda$ and $\gamma$ are selected as a function of a predetermined accuracy.

14. A method for performing a static timing analysis (STA) on a circuit that includes gates with their interconnects, the method comprising:
   a) selecting a primitive gate and determining its fan-out gates and interconnects attached to the primitive gate's output and interconnects attached to output of each respective fan-out gate;
   b) for each fan-out gate, replacing it with its nonlinear model if its Miller capacitance has a predetermined effect on the timing;
   c) for each fan-out gate, replacing it with a capacitance if its Miller capacitance does not have a predetermined effect on the timing;
   d) replacing the primitive gate with its nonlinear model if at least one of the respective fan-out gates has the predetermined effect of its Miller capacitance on timing;
   e) performing a timing simulation on the circuit to generate voltage waveforms at the output of the primitive gate and the input of its fan-out gates that incorporate the effect of the Miller capacitance said timing simulation being executed by a computer; and
   f) iteratively repeating steps a) through e).

15. The method as recited in claim 14, wherein when if none of the fan-out gates have the predetermined Miller capacitance effect on timing, then performing a gate and interconnect timing analysis.

16. The method as recited in claim 14, wherein said step of running a timing simulation further comprising:
   i1) calculating a voltage waveform at the output of the primitive gate;

i2) calculating the voltage waveform at the output of each respective fan-out gate, and i3) calculating the voltage waveforms at the input of each respective fan-out gate.

17. The method as recited in claim 14, wherein said calculated voltage waveforms propagate from a primary input to a primary output.

18. A program storage device readable by a machine, tangibly embodying a program of instructions executable by the machine to perform method steps for selectively analyzing Miller capacitance effects in a circuit consisting of gates and interconnects while performing a static timing analysis (STA), said method steps comprising:

a) selecting a primitive gate and its respective fan-out gates, the interconnects attached to the primitive gate output and the interconnects connected to each of said fan-out gates' outputs;

b) replacing the primitive gate with its nonlinear model equivalent, and selectively replacing the fan-out gates with their nonlinear model equivalent, leaving the fan-out gate connected to its interconnect, or else replacing other fan-out gates with a linear capacitance;

c) performing a simulation on the IC of step b) that generates voltage waveforms, propagation delays or transition times at the output of the primitive gate and at the input of its fan-out gates that incorporate the effects of the Miller capacitance; and d) propagating the voltage waveforms, propagation delays or transition times to a next stage thereof, and repeating steps a) through c) until all the primary outputs of the IC are reached.

* * * * *